Feb. 6, 1968

C. D. COX 3,367,293

LANDSCAPING IMPLEMENT

Filed May 31, 1966

INVENTOR:
CLYDE D. COX

BY Parrott, Bell, Seltzer, Park & Heard
ATTORNEYS

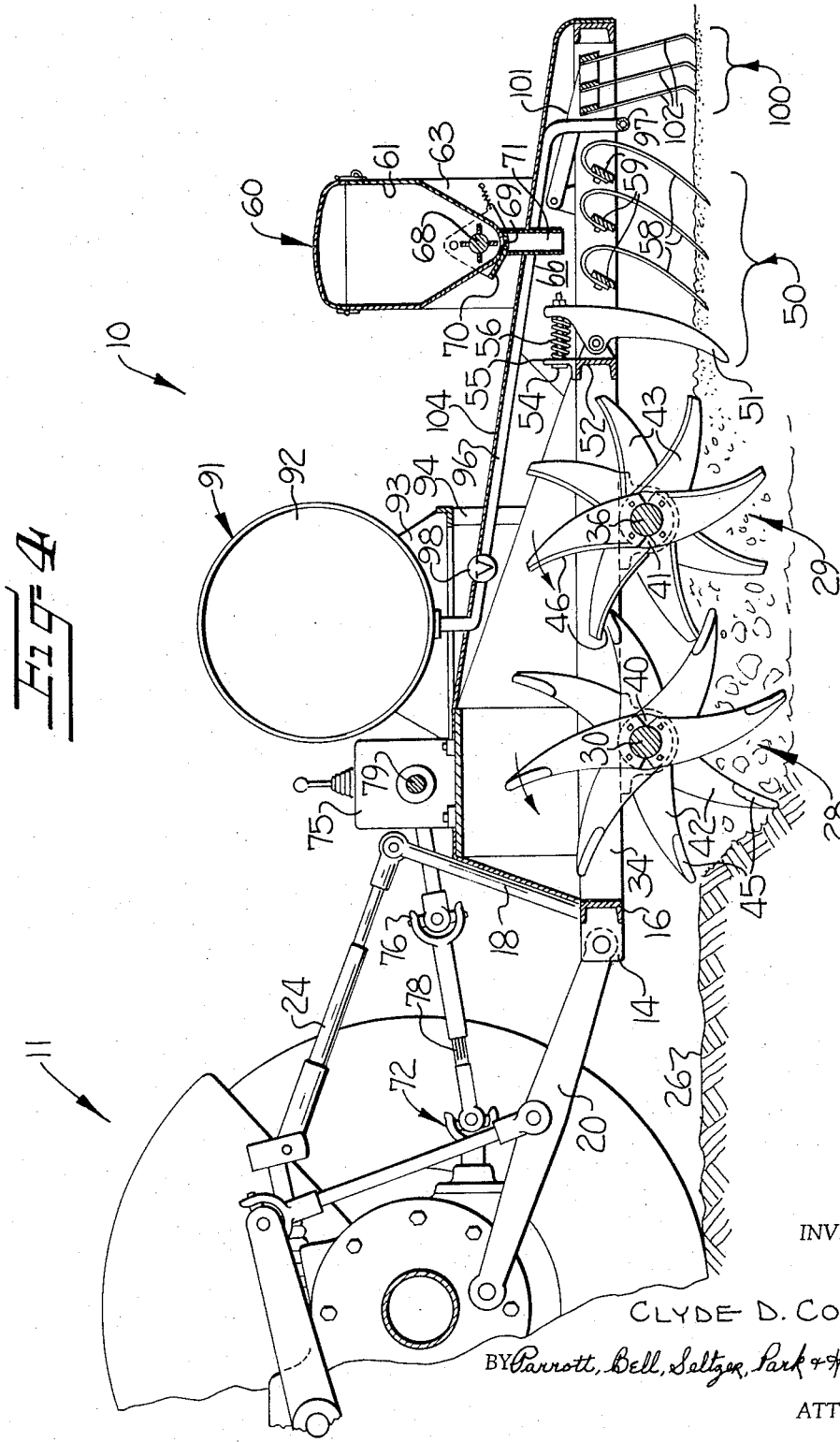

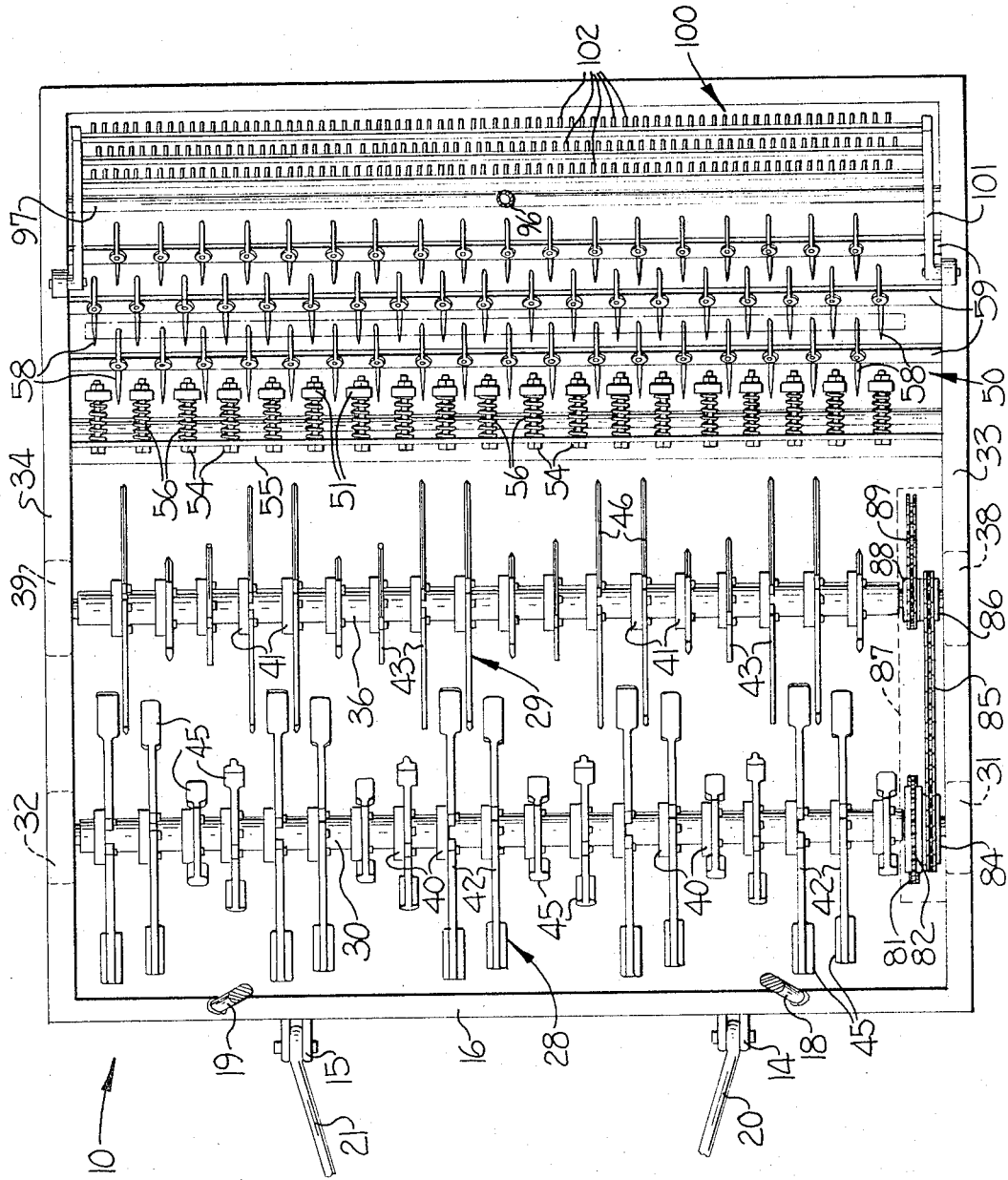

3,367,293
LANDSCAPING IMPLEMENT
Clyde D. Cox, 1375 Amelia Ave., Rock Hill, S.C. 29730
Filed May 31, 1966, Ser. No. 553,905
4 Claims. (Cl. 111—6)

ABSTRACT OF THE DISCLOSURE

A landscaping implement supported from a tractor vehicle and having power driven ground pulverizing means, harrow means, grass seed distributing means, fertilizer distributing means and rake means for performing the corresponding operations in the same sequence as done manually in preparing ground as a lawn and in a uniform manner over a swath having a width at least as large as the distance by which the wheels of the tractor vehicle are spaced apart.

---

My invention relates to a landscaping implement and, more particularly, to a landscaping implement which is supported by attachment to an agricultural towing machine such as a tractor and which is adapted to perform in a single traverse of an area of ground all operations which are necessary to prepare that ground for use, including cultivating, harrowing, seeding, raking, and fertilizing.

The preparation of previously untilled ground, or ground which has been long permitted to lie fallow, is an arduous task, but one which has been required when land improvement has been undertaken. The steps which must be followed in preparing such ground for use, as when grasses are sown in preparing ground as a lawn, are well established through long usage and practice. In order to obtain the best possible result from seeding, it is necessary that the ground be cultivated, to remove roots, plants and the like from the area being prepared and to loosen the soil. After cultivation, the relatively large clods or chunks of earth must be broken into smaller sized fragments, at least on the surface, in order to further loosen the soil and prepare a more uniform surface of fine soil for further work. Typically, this operation involves the use of a harrow or similar device. Thereafter, the cultivated and harrowed ground is seeded with suitable seed for the intended purpose, and the seed raked into the prepared ground. The seeded and raked prepared ground may then be fertilized, to assure proper growth of the seeds, such as lawn grasses.

Heretofore, these successive operations necessary to prepare ground have been performed either by hand or through successive traverses of an area of ground to be prepared by a number of agricultural implements, each of which performs a single operation in the sequence of preparation. For example, where large areas of ground are to be prepared, the ground is first plowed, using a plowing implement towed by an agricultural machine such as a tractor. Thereafter, the plowing implement is replaced by a harrowing implement, and the area of ground to be prepared is again traversed in order to harrow the plowed surface. Seeding is then done by hand or machine broadcasting, and the seeded area is then raked, usually by hand. Subsequently, fertilizer is applied to the prepared ground by hand or machine broadcasting. Each operation in the sequence required to prepare the ground is performed throughout the entire area to be prepared, before the next operation is undertaken. While this sequence of operations is common to a large number of agricultural plantings, the separate performance of each operation has presented particular difficulties in the preparation of ground as a lawn, in that the relatively small area of ground usually being prepared will not permit the use of large implements primarily intended for farming use and in the expense of the substantial hand labor required.

With the foregoing in mind, it is an object of my invention to provide a landscaping implement which is compact in size to facilitate use in relatively small areas, adapted to be attached to and driven from a towing machine such as a tractor, and which permits a single operator to perform the necessary sequence of operations to prepare ground in a single traverse of the ground.

A more detailed object of my invention is to provide a landscaping implement including rotatably driven cultivator means for cultivating and initially loosening the ground to be prepared, harrowing means for further loosening the ground and forming a more uniform prepared surface of fine soil, seed distributing means for seeding the cultivated and harrowed ground, raking means for raking the seeded ground, and fertilizer distributing means for distributing fertilizer on the seeded and raked ground. In accordance with my invention, the various operating elements of my landscaping implement are supported on a frame which may be connected to and supported from a conventional towing machine such as a tractor, with the operating elements being so arranged as to successively perform the required operations in the preparation of ground on traverse of the implement across an area of ground to be prepared.

Some of the objects and advantages of the invention having been stated, others will appear as the description proceeds, when taken in connection with the accompanying drawings, in which FIGURE 1 is a plan view of an implement in accordance with this invention as attached to and supported by a towing machine such as a tractor;

FIGURE 4 is an elevation view, in partial section, of the implement and tractor of FIGURE 1 during use, taken generally along the line 4—4; and FIGURE 5 is a plan view of the operating elements of the landscaping implement.

Figure 1:
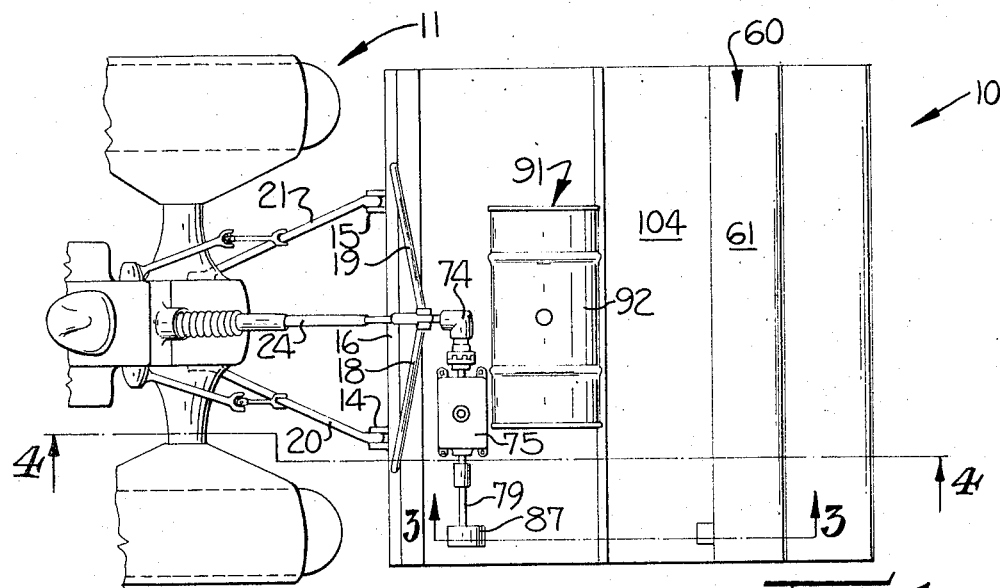

Referring now more particularly to the drawings, the landscaping implement of my invention is there shown, and indicated generally at 10. The implement 10 is constructed to be compact in size and adapted to be readily attached to a towing machine such as a tractor, indicated generally at 11, to be supported from the tractor and moved thereby in traversing areas of ground to be prepared, as described in greater detail hereinafter.

The implement 10 comprises a frame, upon which the operating elements of the implement 10 are supported as will be described more fully hereinafter, and which is provided with hitching means at one end thereof for connection to the tractor 11 for supporting the implement 10 therefrom. Preferably, the hitching means is of a type adapted for use with the suspension and towing arrangement known as a "three-point suspension," and is provided on the frame by projecting lugs 14 and 15 extending forwardly of a forward frame cross member 16 and by upwardly extending standards 18 and 19, secured to and extending upwardly from the frame cross member 16. The three attachment points provided by the projecting lugs 14 and 15 and by the standards 18 and 19 permit attachment of the implement 10 to the tractor 11, through the use of three trailing links as is generally well known.

For purposes of clarity, such an attachment will now be described in greater detail. First and second trailing links or drag bars 20, 21 extend rearwardly from the lower portion of the frame of the tractor 11, and are connected by suitable pintle connections to the forwardly extending lugs 14 and 15. The connection of one such trailing link 21 to one of the projecting lugs 15 is shown in FIGURE 4. The trailing link 21 is connected by pivotal connections to the frames of both the landscaping implement 10 and the tractor 11. A top link 24 is pivotally connected, as by means of a suitable pintle, to the standards 18, 19. As is conventional in a three-point suspension attachment for a tractor, such as the tractor 11, the position of the top link 24 may be controlled by a hydraulic cylinder on the tractor 11. By raising and lowering the top link 25, the implement 10 may be set in a desired position relative to the surface 26 (FIGURE 4) of the ground being worked. Additionally, the implement 10 may be raised clear of the ground for transport between job locations. As will be brought out more fully hereinafter, the implement 10 is constructed particularly to facilitate such raising and transportation.

In order to perform the first step in the process of preparing the ground 26, the landscaping implement 10 of my invention includes first and second cultivating means, generally indicated at 28 and 29, respectively (FIGURE 4). The particular construction of each of the first and second cultivator means 28, 29 will be described in greater detail hereinafter. Each of the cultivator means 28, 29 extends transversely of the implement frame and is supported thereon for rotation. The second cultivator means is spaced rearwardly from the first cultivator means for purposes to be described more fully hereinafter. Briefly, the first cultivator means 28 includes a shaft 30, which is received in and supported by bearings 31, 32 which are in turn mounted on fore and aft extending side frame members 33 and 34, respectively. Similarly, the second cultivator means 29 includes a shaft 36, rotatably supported by bearings 38 and 39 which are in turn mounted on the side frame members 33 and 34.

In assembling the first and second cultivator means 28, 29, each of the shafts 30, 36 is provided with a plurality of support rings 40, 41 secured therearound at laterally spaced apart intervals. To each of the ring members 40, 41 is secured a pair of cultivator teeth, with the first cultivator means 28 having teeth 42 which have spatulate radial outer terminal end portions 45, constructed particularly for turning the ground 26 over which the implement 10 has traversed. The cultivator teeth 43 of the second cultivator means 29 are of slightly shorter radial length than the teeth 42 of the first cultivator means 28, and have the leading edge 46 thereof sharpened throughout its radial extent. The teeth 42, 43 of both the cultivator means 28, 29 are mounted on the respective support rings 40, 41 in a spiral array laterally of the cultivator means (FIGURE 4), with immediately adjacent pairs being displaced through a 45° angle. In operation, as the cultivator means are driven in rotation, the first cultivator 28 digs into and turns the ground 26 being traversed by the implement 10, to break the ground from its natural state and to rip up plants, roots and the like embedded in the ground. Roots and the like are lifted between adjacent pairs of teeth 42 of the front cultivator means 28 and, due to the spacing of the teeth of the second cultivator means 29, are severed by the sharpened leading edges 46 of the teeth 43 of the second cultivator means, which additionally serve to further comminute or grind up the soil being prepared.

In order to provide a more uniform surface for the ground being prepared, my landscaping implement 10 includes harrowing means mounted on the implement frame rearwardly of the first and second cultivator means 28, 29, and indicated generally at 50 (FIGURE 4). Preferably, the harrow means 50 includes a leading row of heavy duty harrow teeth 51, with each tooth 51 of the leading row being pivotally supported from a transverse frame member 52 to depend therefrom and engage the cultivated surface of the ground 26. While the teeth 51 are pivotally supported for free pivotal movement, a biasing means is provided to bias the lower extremity of each tooth 51 forwardly into engagement with the ground 26, while permitting rearward pivotal movement of the lower portion of the tooth 51 where necessary to avoid breakage of the tooth, as upon striking a rock, stone, or other object embedded in the soil. The biasing means takes the form of a bolt 54, penetrating the upper portion of a tooth 51 and a transverse member 55 overlying the transverse frame member 52. Surrounding the bolt 54 and interposed between the uupper extremity of a tooth 51 and the transverse member 55 is a compression coil spring 56, which is compressed upon rearward pivotal movement of the lower portion of the tooth 51 with which the biasing means is associated.

Rearwardly of the first row of harrowing teeth 51, the harrowing means 50 further comprises a plurality of rows of spring harrow teeth 58, preferably arranged in a staggered array in order to assure the entire area of ground across which the landscaping implement 10 of my invention is traversed is made uniform. Each of the spring harrow teeth at 58 is suitably mounted on and supported from a transverse member 59, extending between the side members 33, 34 of the implement frame.

In order to seed the ground which has been cultivated by the first and second cultivator means 28, 29 and made more uniform by the harrowing means 50, the landscaping implement 10 of my invention additionally includes a seed distributing means, generally indicated at 60. The seed distributing means includes a seed containing hopper 61, supported to overlie the harrowing means 50 by vertically extending standards 62, 63, which are formed integrally with fore and aft extending frame side plates 65 and 66. Within the hopper, and adjacent the lower extremity thereof, is positioned a transversely extending seed distributing rotor 68, supported within the hopper 61 for rotation to feed predetermined quantities of seed from a seed outlet opening 69 at the lower extremity of the hopper 61. Preferably, a seed valve means in the form of a transversely extending and pivotally mounted valve member 70 is provided to controllably close the seed feeding opening 69, to permit an operator of the landscaping implement 10 to control the release of seed from the seed distributing means 60 as may be desired. Seed released from the hopper 61 of the seed distributing means 60 through the seed feeding outlet 69 passes through a seed drop spout 71 and is distributed on the surface of the ground 26 being traversed by the landscaping implement 10.

Figure 3:
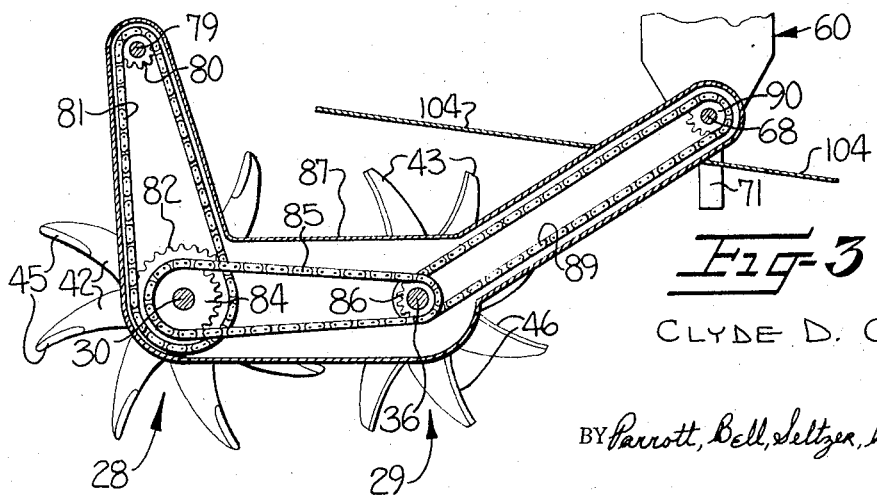
FIGURE 3 is a schematic sectional view of a portion of the implement of FIGURE 1, taken generally as indicated by the line 3—3 in that figure.

In order to drive the first and second cultivator means 28, 29 and the seed feeding rotor 68 of the seed distributing means 60, the landscaping implement 10 of my invention includes means for drivingly connecting each of the above-mentioned rotatably supported elements to a power take-off point of the tractor 11. More particularly, it is conventional for a towing machine such as the tractor 11 to provide a transfer case from which a power take-off is available. With the tractor 11, such a power take-off point is available at a universal joint 72. In accordance with this invention, a 90° transmission 74 and a multi-speed reduction gearbox 75 are mounted on a transverse frame plate 73 and operatively connected to a universal joint 76, for connection to the power take-off universal joint 72 by means of a splined extensible shaft 78. The gearbox 75 permits an operator of the implement 10 to select a rotational speed for the driven elements appropriate to the condition of the ground being prepared. Upon engagement of the power take-off of the tractor 11, the take-off point universal joint 72 is driven in rotation, and that rotation is transmitted through the right angle transmission 74 and the gearbox 75 to an output shaft 79, on which a drive sprocket 80 is fixed (FIGURE 3). The drive sprocket 80 is drivingly connected by suitable means, such as a chain 81, to a driven sprocket 82 fixed on the shaft 30 of the first cultivator means 28. A secondary driving sprocket 84, also fixed to the shaft 30 of the first cultivator means 28, is connected by suitable means such as a chain 85 to a sprocket 86 fixed on the shaft 36 of the second cultivator means 29. A third driving sprocket (hidden from view in FIGURE 3), similarly fixed on shaft 36 of the second cultivator means 29, is drivingly connected by means of a chain 89 to a driven sprocket 90 fixed on the seed feeding rotor 68 of the seed distributing means 60. By these transmission paths, the first and second cultivator means 28, 29 and the seed distributing means 60 are driven from the power take-off point of the tractor 11. In order to protect the various elements of the transmission paths and to provide operator safety, the chain drive elements are preferably enclosed within a guard assembly 87.

Figure 2:
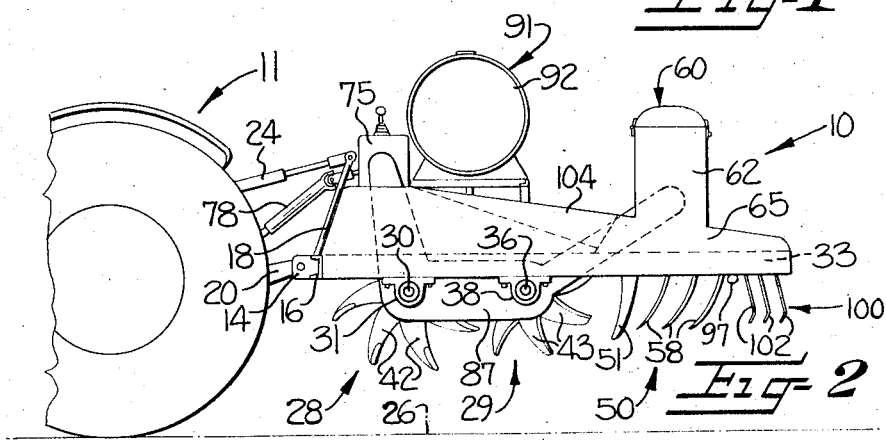
FIGURE 2 is an elevational view of the implement and tractor of FIGURE 1.

The next subsequent step in the process of preparing ground, after cultivation, harrowing, and seeding, is performed by a fertilizer distributing means 91, mounted on the frame of the landscaping implement 10 to distribute fertilizer rearwardly of the distribution location of seeds from the seed distributing means 60. As liquid fertilizers are preferably used in the preparation of ground as a lawn, the fertilizer distributing means 91 includes a liquid fertilizer drum 92, which is supported on the frame of the implement 10 by suitable platform members 93, 94. A fertilizer pipe or conduit 96 communicates with the fertilizer drum 92 from below and extends toward the rearward extremity of the landscaping implement 10. Adjacent the rearward end of the implement 10 is a transversely extending fertilizer distributing pipe 97, which is provided with a number of openings spaced therealong through which liquid fertilizer may flow onto the prepared surface of the ground 26 across which the implement 10 has been traversed. In order to control the flow of liquid fertilizer, a valve 98 is preferably interposed in the fertilizer conduit 96 and may be suitably operated by a remote control either by an operator riding on the tractor 11 or by a linkage arrangement to the three-point suspension members supporting the implement 10 from the tractor 11. In the latter instance, the linkage arrangement (not shown) moves the valve 98 to an open position when the implement 10 is lowered to an operating position in engagement with the ground 26, and to a closed position when the implement 10 is raised to a transport position (FIGURE 2).

To complete the steps in the process of the preparation of ground as a lawn, the landscaping implement 10 of my invention includes a raking means 100, mounted on the frame of the landscaping implement 10 rearwardly of the distribution location of fertilizer from the fertilizer distributing means 91. The raking means 100 preferably takes the form of a generally U-shaped raking frame element 101, pivotally connected to the forward extremities of the legs of the U to the side frame members 33, 34 of the implement 10, for vertical movement of the trailing portion of the raking frame member 101. Depending from the laterally extending rearward portion of the raking frame member 101 are a number of rake tines 102, which preferably are small diameter, stiff and springy members of steel. The primary function of the raking means 100 is to assure that seeds distributed by the seed distributing means 60 are properly raked into the surface of the ground 26, as is required in good landscaping practice.

As mentioned briefly above, the landscaping implement 10 in my invention is particularly constructed for attachment to a tractor 11 by a three-point suspension. In order to facilitate control over the height of the landscaping implement 10 through the use of the three-point suspension, and to reduce the necessity providing counterweights on the tractor 11 to compensate for the weight of the implement 10, the implement is constructed with the greatest amount of weight possible placed forwardly on the implement 10 so as to be positioned as closely as possible to the tractor 11. This may be noted in the placement of the frame cross member 73, the right angle transmission 76, the multi-speed transmission 75, and the fertilizer drum 92. Additionally, triangular gusset-shaped frame side plates (best illustrated in FIGURE 4) are used to connect the various supporting frame elements of the implement 10, while reducing the rearward bias of the weight of the frame elements. Preferably, a sheet metal cover 104 extends over the exterior of the implement 10, to assure operator safety from contact with the operating elements of the implement and to provide a smooth and pleasing external appearance.

As may readily be seen, upon traverse of the landscaping implement 10 of my invention across an area of ground 26 to be prepared as a lawn, the five steps in the procedure necessary to prepare the ground for use as a lawn are successively performed by the cultivator means, the harrowing means, the seed distributing means, the fertilizer distributing means and the raking means. Thus, in a single traverse of an area of ground to be prepared, the preparation has been completed, and no further work is necessary. The saving in time and labor thus realized is quite significant in landscaping operations.

In the drawings and specification, there has been set forth a preferred embodiment of the invention, and although specific terms are employed, they are used in a generic and descriptive sense only and not for purposes of limitation, the scope of the invention being defined in the claims.

I claim:

1. The combination, with a tractor vehicle having a pair of rear traction wheels spaced a predetermined distance apart, a power take-off means and a motive power means operatively connected with said traction wheels and take-off means, of a landscaping implement for performing a sequence of operations in preparing ground as a lawn, the implement being mounted to and supported from said tractor vehicle and comprising:

a frame having a predetermined transverse width at least substantially the same as said predetermined distance by which said traction wheels are spaced apart and including hitching means at a forward end of said frame for connection to said tractor vehicle for supporting the frame therefrom, first and second cultivator means extending transversely of said frame and supported thereon at longitudinally spaced apart locations rearwardly of said hitching means for rotation relative to said frame and about generally parallel normally horizontal axes, each of said cultivator means comprising a shaft having a length at least substantially the same as said frame transverse width and a plurality of radially outwardly projecting pulverizing teeth spaced circumferentially apart and axially along said shaft throughout substantially the entire transverse length thereof, transmission means including a changeable ratio gearbox and operatively interconnecting said power take-off of said tractor vehicle and said first and second cultivator means shaft for driving said shafts in rotation from said motive power means, harrowing means mounted on said frame rearwardly of said first and second cultivator means and including a plurality of depending harrowing teeth spaced across substantially the entire transverse extent of said frame, seed distributing means supported on said frame rearwardly of said first and second cultivator means and extending across substantially the entire transverse extent thereof for distributing seed upon the surface of cultivated ground, fertilizer distributing means supported on said frame and including a distributing manifold positioned rearwardly of sad harrowing means and said seed distributing means and extending transversely of said frame across substantially the entire transverse extent of said frame for distributing fertilizer upon the surface of seeded ground, and raking means mounted on said frame rearwardly of said harrowing means for raking seeded and fertilized ground, so that substantially uniform pulverization, seeding and fertilization of ground traversed by the tractor vehicle and implement is obtained and preparation of the ground as a lawn is thereby facilitated.

2. The combination of claim 1 wherein said seed distributing means comprises a seed feeding rotor and further comprising an endless flexible member supported for movement along a closed path of travel and connecting said rotor and one of said cultivator means shafts.

3. The combination of claim 2 wherein said fertilizer distributing means comprises a fertilizer reservoir container supported on said frame adjacent the hitching means end thereof, and a conduit connecting said manifold and said reservoir container, the positioning of said reservoir container being such that overturning forces on the towing machine otherwise resulting from elevation of the implement relative to said tractor vehicle are minimized.

4. The combination of claim 3 wherein said raking means comprises a sub-frame member extending laterally of said frame and pivotally connected thereto at the lateral extremities of said member for vertical movement with respect to said frame and a plurality of depending tines mounted on said sub-frame member.

References Cited
UNITED STATES PATENTS

| | | | |
|---|---|---|---|
| 335,966 | 2/1886 | Shaw | 111—10 |
| 364,906 | 6/1887 | Crane | 111—9 |
| 2,455,147 | 11/1948 | Traver | 172—146 X |
| 2,559,183 | 7/1951 | Barnett | 111—7 X |
| 2,719,498 | 10/1955 | Goolsby | 111—7 X |
| 3,110,275 | 11/1963 | Bonney | 111—70 |

ROBERT E. BAGWILL, *Primary Examiner.*